US008564258B2

(12) United States Patent
Suzuki

(10) Patent No.: US 8,564,258 B2
(45) **Date of Patent: *Oct. 22, 2013**

(54) SEMICONDUCTOR INTEGRATED CIRCUIT AND METHOD OF CONTROLLING MEMS-TYPE VARIABLE CAPACITANCE CAPACITOR

(75) Inventor: Atsushi Suzuki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 13/304,997

(22) Filed: Nov. 28, 2011

(65) Prior Publication Data

US 2012/0068672 A1 Mar. 22, 2012

Related U.S. Application Data

(63) Continuation of application No. 12/206,179, filed on Sep. 8, 2008, now Pat. No. 8,076,912.

(30) Foreign Application Priority Data

Sep. 12, 2007 (JP) ................................ 2007-236177

(51) Int. Cl.

| | |
|---|---|
| ***G05F 1/00*** | (2006.01) |
| ***G05F 1/10*** | (2006.01) |
| ***G05F 3/02*** | (2006.01) |
| ***H02M 3/07*** | (2006.01) |

(52) U.S. Cl.

USPC ............ 323/242; 327/538; 327/540; 327/589

(58) Field of Classification Search

USPC .......... 323/234, 242, 288; 327/538, 540, 589; 310/309

See application file for complete search history.

(56) References Cited

U.S. PATENT DOCUMENTS

| | | | |
|---|---|---|---|
| 6,737,907 | B2 | 5/2004 | Hsu et al. |
| 6,940,629 | B2 | 9/2005 | Gurcan |

(Continued)

FOREIGN PATENT DOCUMENTS

| | | |
|---|---|---|
| JP | 2002-36197 | 2/2002 |
| JP | 2002-142448 | 5/2002 |
| JP | 2003-264122 | 9/2003 |
| JP | 2007-242607 | 9/2007 |

*Primary Examiner* — Adolf Berhane
*Assistant Examiner* — Emily P Pham
(74) *Attorney, Agent, or Firm* — Oblon, Spivak, McClelland, Maier & Neustadt, L.L.P.

(57) ABSTRACT

A first pump circuit generates a first voltage for decreasing the distance between primary electrodes. The first voltage is limited to a predetermined limit by a first limiter circuit. A second pump circuit generates a second voltage for keeping the distance between the primary electrodes constant. A third pump circuit generates the second voltage and has a supplying capacity smaller than the first one. The second voltage is limited by second and third limiter circuits. A ripple capacitor is charged up to the second voltage by the second pump circuit and the second limiter circuit within a period of time the first voltage is being generated. When a supplying voltage of the first pump circuit reaches to the first voltage, and a deformation stops, the second voltage is supplied by the third pump circuit and the third limiter circuit instead of the second pump circuit and the second limiter circuit.

4 Claims, 4 Drawing Sheets

(56) References Cited

U.S. PATENT DOCUMENTS

| | | | | |
|---|---|---|---|---|
| 7,027,282 | B2 | 4/2006 | Ryhänen et al. | |
| 7,119,550 | B2 * | 10/2006 | Kitano et al. | 324/658 |
| 7,172,917 | B2 * | 2/2007 | Partridge et al. | 438/50 |
| 7,180,145 | B2 | 2/2007 | Musalem et al. | |
| 7,203,111 | B2 | 4/2007 | Martin et al. | |
| 7,333,400 | B2 | 2/2008 | Blondeau et al. | |
| 7,388,316 | B2 | 6/2008 | Musalem et al. | |
| 2004/0214543 | A1 * | 10/2004 | Osone et al. | 455/197.2 |
| 2006/0285255 | A1 | 12/2006 | Kawakubo et al. | |
| 2007/0181411 | A1 | 8/2007 | Ikehashi et al. | |

* cited by examiner 10
11
12
13
14
14a
14b
14b
15
15a
15b
15b
16
d
Ces1
Ces2
Crf
Driver IC
20

SEMICONDUCTOR INTEGRATED CIRCUIT AND METHOD OF CONTROLLING MEMS-TYPE VARIABLE CAPACITANCE CAPACITOR

CROSS REFERENCE TO RELATED APPLICATIONS

This application is a continuation of U.S. application Ser. No. 12/206,179 filed Sep. 8, 2008, and is based on and claims the benefit of priority from prior Japanese Patent Application No. 2007-236177, filed on Sep. 12, 2007, the entire contents of each of which are incorporated herein by reference.

BACKGROUND OF THE INVENTION

1. Field of the Invention

The present invention relates to a semiconductor integrated circuit, and more specifically, to a semiconductor integrated circuit controlling a variable capacitance capacitor using Micro Electro Mechanical Systems (MEMS) (hereinafter, referred to as a "MEMS-type variable capacitance capacitor") and a method of controlling that MEMS-type variable capacitance capacitor.

2. Description of the Related Art

MEMS-type variable capacitance capacitors form their electrodes at relatively-movable portions with a MEMS structure and cause a physical change to the distance between two electrodes by deformation of the movable portions, which allows change in capacitance between the electrodes (see, for example, Japanese Patent Laid-Open No. 2002-36197). For example, in addition to capacitor's electrodes (primary electrodes), auxiliary electrodes are also provided for deformation and capacitance change. The auxiliary electrodes may increase electrostatic capacitance of the capacitor by applying a voltage (deformation voltage Vact) between the auxiliary electrodes and decreasing the distance between the capacitor's electrodes by the Coulomb force. Conversely, when the voltage application between the auxiliary electrodes stops, elastic force acts thereon to restore the original form against the deformation, the capacitor's electrodes return to the original positions, and the electrostatic capacitance of the capacitor is reduced to the original value.

When the electrostatic capacitance of the capacitor is required to be kept constant after decreasing the distance between the electrodes, it is necessary to keep the distance between the capacitor's electrodes constant while continually applying a constant voltage (hold voltage Vhold) between the auxiliary electrodes. In addition, the hold voltage (Vhold) is lower than a deformation voltage (Vact) for use in decreasing the distance between the electrodes.

It is desirable that the hold voltage Vhold is set as low as possible in order to reduce the amount of charges trapped into the insulator between the auxiliary electrodes, to improve the reliability of MEMS-type variable capacitance capacitors, and to reduce the power consumption.

SUMMARY OF THE INVENTION

One aspect of the present invention provides a semiconductor integrated circuit controlling a MEMS-type variable capacitance capacitor having primary electrodes with a MEMS structure for frequency modulation and auxiliary electrodes changing the distance between the primary electrodes to change the capacitor's electrostatic capacitance, the semiconductor integrated circuit comprising: a first pump circuit generating a first voltage for decreasing the distance between the primary electrodes; a first limiter circuit limiting the first voltage to a predetermined limit; a second pump circuit generating a second voltage for keeping the distance between the primary electrodes constant and having a first supplying capacity; a second limiter circuit limiting the second voltage generated by the second pump circuit to a predetermined limit; a third pump circuit generating the second voltage and having a second supplying capacity smaller than the first supplying capacity; a third limiter circuit limiting the second voltage generated by the third pump circuit to a predetermined limit; and a ripple capacitor suppressing ripple of the second voltage; wherein the ripple capacitor is charged up to the second voltage by the second pump circuit and the second limiter circuit within a period of time the first voltage is being generated by the first pump circuit and the first limiter circuit, and wherein, when a supplying voltage of the first pump circuit reaches to the first voltage and a deformation of the MEMS-type variable capacitance capacitor stops, the second voltage is generated by the third pump circuit and the third limiter circuit instead of the second pump circuit and the second limiter circuit.

Another aspect of the present invention provides a method of controlling a MEMS-type variable capacitance capacitor having primary electrodes with a MEMS structure for frequency modulation and auxiliary electrodes changing the distance between the primary electrodes to change the capacitor's electrostatic capacitance, the method comprising: generating a second voltage to be supplied to auxiliary electrodes by a second pump circuit for keeping the distance between the primary electrodes constant within a period of time a first voltage is being generated by a first pump circuit for decreasing the distance between the primary electrodes; and when a supplying voltage of the first pump circuit reaches to the first voltage and a deformation of the MEMS-type variable capacitance capacitor stops, generating and supplying the second voltage to the auxiliary electrodes by a third pump circuit instead of the second pump circuit, the third pump circuit having smaller supplying capacity than that of the second pump circuit.

DETAILED DESCRIPTION OF THE EMBODIMENTS

Figure 1:
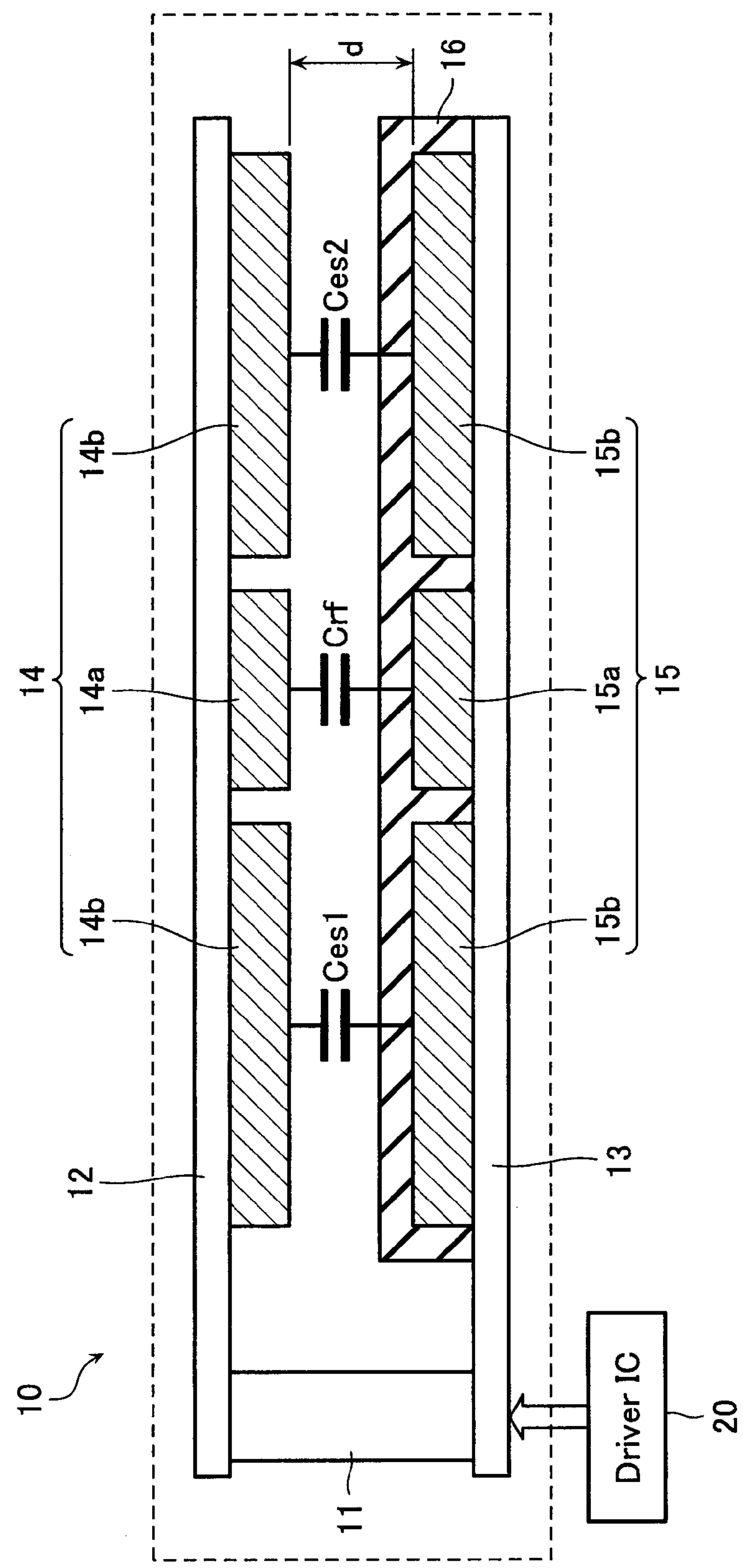
FIG. 1 is a diagram illustrating a configuration of a semiconductor integrated circuit and a MEMS-type variable capacitance capacitor according to an embodiment of the present invention.

An Embodiment of the present invention will now be described in detail below with reference to the accompanying drawings. FIG. 1 illustrates a configuration of a semiconductor integrated circuit and a MEMS-type variable capacitance capacitor according to this embodiment. The MEMS-type variable capacitance capacitor 10 and the driver IC 20 may be formed on the same silicon substrate (not illustrated), or may be formed on separate substrates and connected by wiring.

FIG. 1 illustrates an example structure of the MEMS-type variable capacitance capacitor 10. The MEMS-type variable capacitance capacitor 10 has a movable part 12 and a fixed part 13, each of which extends from a beam part 11 fixed to a substrate (not illustrated). An upper electrode 14 is formed on the movable part 12 and a lower electrode 15 is formed on the fixed part 13. An insulating film 16 of, e.g., silicon oxide is formed on the surface of the lower electrode 15 to prevent contacting the upper electrode 14.

The movable part 12 on which the upper electrode 14 is formed is configured to be movable by elastic force with respect to the beam part 11 that is fixed to the substrate. Thus, the upper electrode 14 may physically move with respect to the lower electrode 15. The electrostatic capacitance Crf of the capacitor, which is configured by the upper electrode 14 and the lower electrode 15, varies with distance d between the electrodes. The fixed part 13 is fixed with respect to the beam part 11.

Each of the upper electrode 14 and the lower electrode 15 comprises auxiliary electrodes 14*b* and 15*b* for decreasing or maintaining the distance between the primary electrodes 14*a* and 15*a*, in addition to primary electrodes 14*a* and 15*a* for retaining charges. The coulomb force caused by applying a voltage (deformation voltage Vact) for decreasing distance d between the auxiliary electrodes 14*b* and 15*b* may decrease the distance d between the primary electrodes 14*a* and 15*a*. Conversely, when the voltage application between the auxiliary electrodes 14*b* and 15*b* stops, the movable part 12 returns to the original position due to the effects of elastic force. Accordingly, after decreasing the distance between the primary electrodes 14*a* and 15*a*, the distance d is kept constant by continually applying a constant voltage (hold voltage Vhold) between the auxiliary electrodes 14*b* and 15*b*, which allows an increased capacitance Crf to be maintained.

In addition, the hold voltage Vhold is lower than the deformation voltage Vact. Providing a lower hold voltage Vhold reduces the amount of charges that are trapped into the insulator 16 between the auxiliary electrodes 14*b* and 15*b* and improves the reliability.

Figure 2:
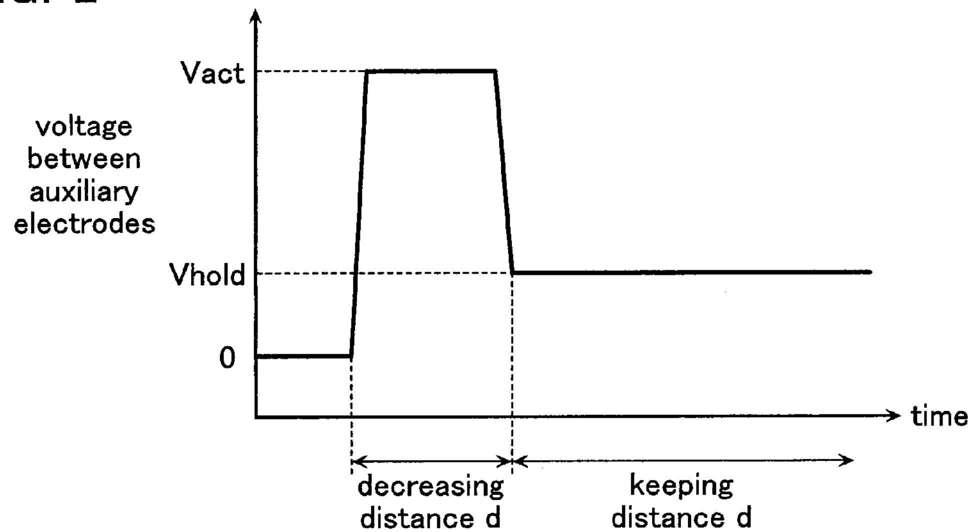
FIG. 2 is a diagram illustrating a time-varying voltage generated by the driver IC 20 and supplied between the auxiliary electrodes 14*b* and 15*b* when varying and maintaining the distance d between the electrodes 14 and 15 illustrated in FIG. 1.

Such voltage applied between the auxiliary electrodes 14*b* and 15*b* is generated by a boost circuit in the driver IC 20. FIG. 2 illustrates a time-varying voltage generated by the driver IC 20 and supplied between the auxiliary electrodes 14*b* and 15*b* when varying and maintaining the distance d. Firstly, the above-mentioned deformation voltage Vact is applied between the auxiliary electrodes 14*b* and 15*b* to decrease distance d. Then, after decreasing the distance d, a hold voltage Vhold that is lower than Vact is applied between the auxiliary electrodes 14*b* and 15*b* as a voltage necessary for keeping the distance d constant. This allows the increased capacitance Crf resulting from decreasing the distance d to be maintained at a high level. Note that a period of applying the deformation voltage Vact is preferably short, in view of maintaining the reliability of the MEMS-type variable capacitance capacitor 10 and decreasing power consumption. For example, 20 microseconds or less is recommended herein.

Figure 3:
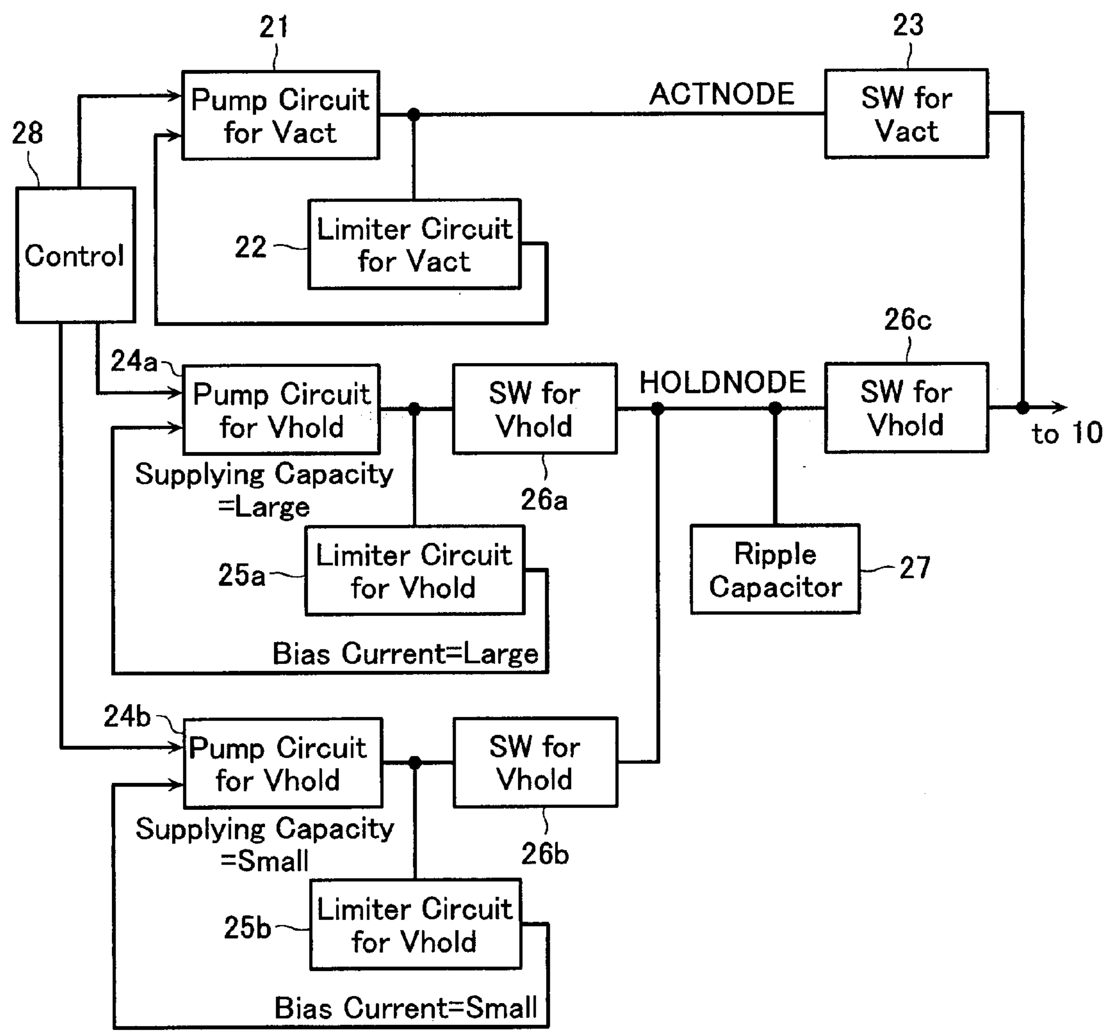
FIG. 3 is a block diagram illustrating an internal structure of the driver IC 20.

FIG. 3 is a block diagram illustrating an internal structure of the driver IC 20. The driver IC 20 comprises a pump circuit 21 for Vact, a limiter circuit 22 for Vact, and a switch 23 for Vact, as a configuration for generating and supplying a deformation voltage Vact.

Figure 4:
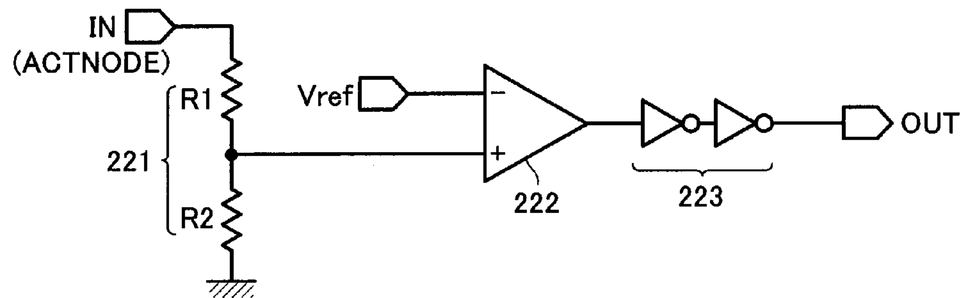
FIG. 4 is a circuit diagram illustrating an example configuration of the limiter circuit 22 for Vact.

The pump circuit 21 for Vact, which may be configured by a general charge pump circuit, boosts a power supply voltage (not illustrated) for each pulse by a pulse signal from a control circuit 28. As illustrated in FIG. 4, the limiter circuit 22 for Vact, which is a circuit for limiting the output voltage of the pump circuit 21 for Vact to a predetermined limit, includes divided resistors 221, a differential amplifier 222, and inverter circuits 223, etc. An input terminal IN is connected to an output node of the pump circuit 21 (ACTNODE).

The divided resistors 221 outputs an output voltage based on a resistance division ratio (for R1, R2). The differential amplifier 222 differentially amplifies the output voltage of the divided resistor 221 and a reference voltage Vref generated by a reference voltage generation circuit (not illustrated). The differentially amplified signal is fedback to the pump circuit 21 for Vact via the inverter circuits 223, maintaining the voltage of the output node ACTNODE at a predetermined voltage (deformation voltage Vact). The switch 23 for Vact is in its ON state while the pump circuit 21 for Vact and the limiter circuit 22 for Vact are in operation, and in its off state while the pump circuit 21 for Vact and the limiter circuit 22 for Vact are in other states.

The driver IC 20 also comprises a pump circuit 24*a* for Vhold, a limiter circuit 25*a* for Vhold, and a switch 26*a* for Vhold, as a first system for generating and supplying a hold voltage Vhold. The pump circuit 24*a* for Vhold, which may be configured by a well-known charge pump circuit as with the above-mentioned pump circuit for Vact, boosts a power supply voltage (not illustrated) for each pulse by a pulse signal from the control circuit 28. The pump circuit 24*a* for Vhold has the supplying capacity that is designed larger than that of a pump circuit 24*b* for Vhold described below. In addition, the limiter circuit 25*a* for Vhold, which is a circuit for limiting the output voltage of the pump circuit 24*a* for Vhold to a predetermined limit, may be configured in a similar way to the limiter circuit 22 for Vact as illustrated in FIG. 4. The pump circuit 24*a* for Vhold and the limiter circuit 25*a* for Vhold in the first system are controlled by the control circuit 28 to operate at the same time within a period of time a deformation voltage Vact is being generated by the pump circuit 21 for Vact and the limiter circuit 22 for Vact. The switch 26*a* for Vhold is in its ON state while the pump circuit 24*a* for Vhold and the limiter circuit 25*a* for Vhold are in operation, and is in its off state while the pump circuit 24*a* for Vhold and the limiter circuit 25*a* for Vhold are in other states. A ripple capacitor 27 is charged during the switch 26*a* for Vhold is in its ON state.

The driver IC 20 further comprises a pump circuit 24*b* for Vhold, a limiter circuit 25*b* for Vhold, and a switch 26*b* for Vhold, as a second system for generating and supplying a hold voltage Vhold. The pump circuit 24*b* for Vhold, which may be configured by a well-known charge pump circuit as with the above-mentioned pump circuit 21 for Vact and pump circuit 24*a* for Vhold, boosts a power supply voltage (not illustrated) for each pulse by a pulse signal from the control circuit 28. The pump circuit 24*b* for Vhold has the supplying capacity that is designed smaller than that of the pump circuit 24*a* for Vhold. That is, it takes longer for the pump circuit 24*b* for Vhold to increase its output voltage to the hold voltage Vhold than that for the pump circuit 24*a* for Vhold. However, power consumption is reduced more correspondingly.

In addition, the limiter circuit 25*b* for Vhold is a circuit for limiting the output voltage of the pump circuit 24*b* for Vhold to a predetermined limit and, specifically, may be configured in a similar way to the limiter circuit 22 for Vact as illustrated in FIG. 4. The bias current of the limiter circuit 25*b* for Vhold (current flowing from an input voltage node IN into the divided resistors 221) may be designed smaller than that of the limiter circuit 25*a* for Vhold. The switch 26*b* for Vhold is in its on state while the pump circuit 24*b* for Vhold and the limiter circuit 25*b* for Vhold are in operation, and is in its off state while the pump circuit 24*b* for Vhold and the limiter circuit 25*b* for Vhold are in other states. The ripple capacitor 27 is charged up while the switch 26*b* for Vhold is in its on state.

When the deformation voltage Vact reaches the certain value and the deformation of the MEMS-type capacitance capacitor stops, the pump circuit 24*b* for Vhold and the limiter circuit 25*b* for Vhold in the second system are controlled by the control circuit 28 to generate and supply a hold voltage Vhold, instead of the pump circuit 24*a* for Vhold and the limiter circuit 25*a* for Vhold in the first system. That is, the first system (24*a*, 25*a*, 26*a*) and the second system (24*b*, 25*b*, 26*b*) are not in operation at the same time: the former only operates during the pump circuit 21 for Vact and the limiter circuit 22 for Vact are in operation, while the latter operates whenever after the pump circuit 21 for Vact and the limiter circuit 22 for Vact stop their operations.

Note that the ripple capacitor 27 is provided at a common output node HOLDNODE of the first and second systems in order to keep the hold voltage Vhold constant. Additionally, a switch 26*c* for Vhold is also provided to selectively output the voltage of the output node HOLDNODE.

As a comparative example, a configuration of a conventional driver IC 20' will now be described below with reference to FIG. 5. The same reference numerals represent the same components as the embodiment of the invention (FIG. 3) and description thereof will be omitted. The conventional driver IC 20' is provided with a group of circuits for generating and supplying a hold voltage Vhold as only a single system (a pump circuit 24*c* for Vhold, a limiter circuit 25*c* for Vhold, and a switch 26*c* for Vhold). If a group of circuits (particularly, pump circuits) for generating and supplying a voltage Vhold is provided as only a single system, it is difficult to achieve both reduction in power consumption and increase in operational speed. In this point of view, this embodiment comprises: a first system having one pump circuit with larger power consumption and a larger supplying capacity; and a second system having another pump circuit with smaller power consumption and a smaller supplying capacity, which are suitable for generating and supplying a voltage Vhold. This may achieve both reduced power consumption and increased operational speed. This will be described below with reference to FIGS. 6 and 7.

Figure 6:
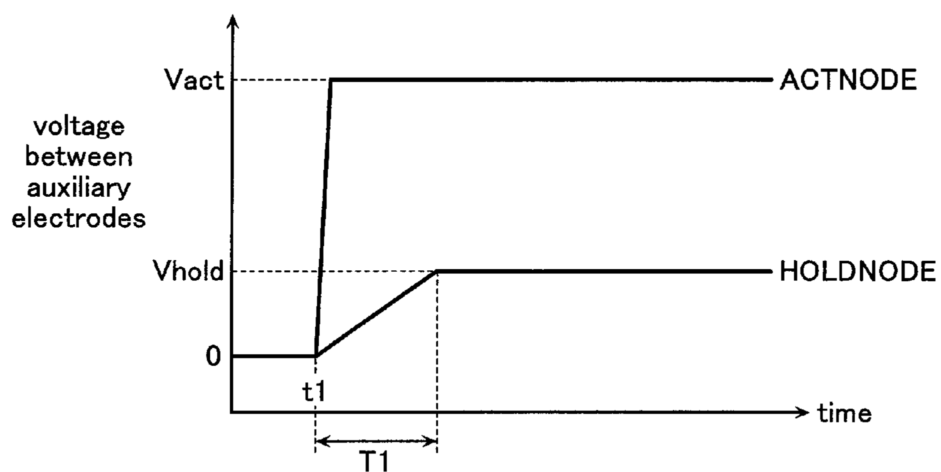
FIG. 6 is a graphical view illustrating the operation of the embodiment of the invention.

FIG. 6 is a graphical view illustrating the operation of the embodiment of the invention. In FIG. 6, the pump circuit 24*a* for Vhold and the limiter circuit 25*a* for Vhold in the first system are operating at the same time to generate a hold voltage Vhold, within a period of time a deformation voltage Vact is being generated by the pump circuit 21 for Vact and the limiter circuit 22 for Vact. The hold voltage Vhold rises to a desired upper limit at time T1, depending on the supplying capacity of the pump circuit 24*a* for Vhold. Then, when the distance d between electrodes 14*a* and 15*a* decreases to a predetermined distance, supply of the deformation voltage Vact stops. After the supply of the deformation voltage Vact stops, the pump circuit 24*b* for Vhold in the second system with smaller power consumption and smaller supplying capacity begins its operation instead of the pump circuit 24*a* for Vhold in the first system (the pump circuit 24*a* stops its operation).

Generally, the time period when the deformation voltage Vact is supplied is longer than that when the hold voltage Vhold is supplied thereafter. Thus, after the supply of the deformation voltage Vact stops, supplying a hold voltage Vhold by the second system (24*b*, 25*b*, 26*b*) rather than by the first system (24*a*, 25*a*, 26*a*) helps decreasing power consumption. In addition, if the pump circuit 24*a* in the first system has large supplying capacity, it is still limited to operate for a short period of time, not affecting much the overall power consumption of the driver IC 20.

Figure 5:
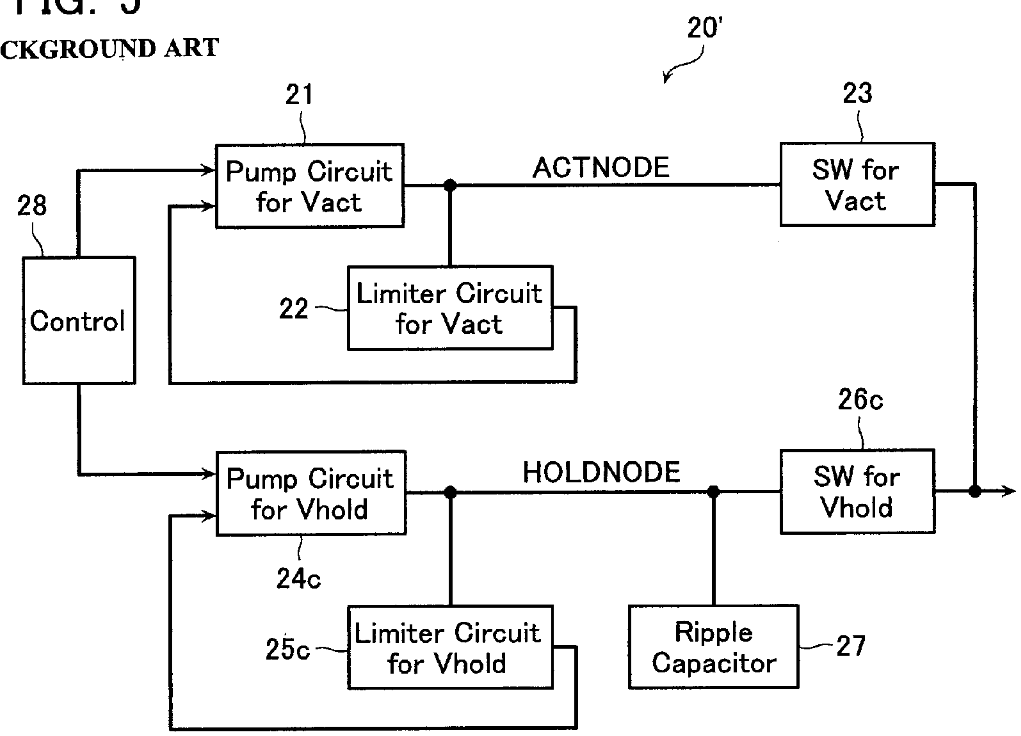
FIG. 5 is a block diagram illustrating a circuit configuration of a conventional driver IC as a comparative example.
Figure 7:
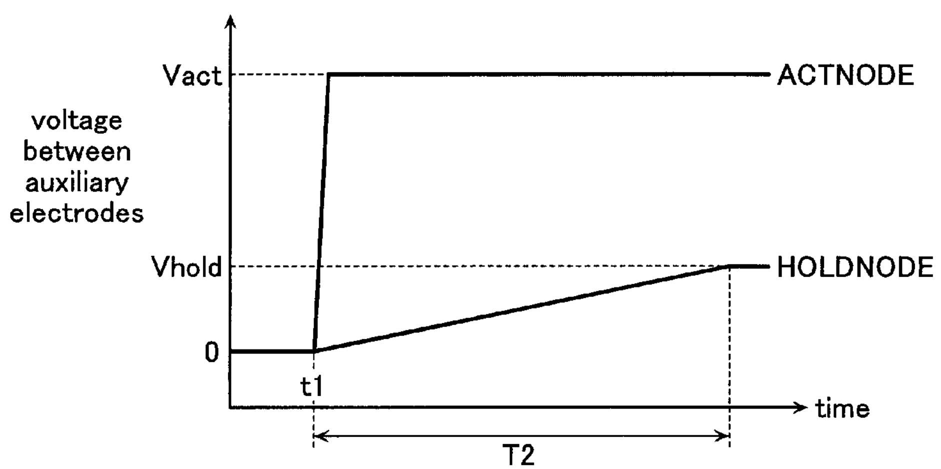
FIG. 7 is a graphical view illustrating the operation of the comparative example.

On the contrary, as with the conventional circuit of FIG. 5, if there is only a single system of circuits for generating and supplying a hold voltage Vhold, it will take longer time T2 for the output voltage Vhold of the pump circuit 24*c* to reach a desired upper limit in an attempt to reduce the power consumption, as illustrated in FIG. 7. As a result a period of applying the voltage Vact must be much longer than the preferable 20 microseconds. If the pump circuit 24*c* is provided with higher supplying capacity in order to shorten the time T2, the power consumption is increased.

As can be seen from the above, the driver IC 20 according to the embodiment of the invention utilizes the pump circuit 24*b* with smaller supplying capacity and the limiter circuit 25*b* with smaller bias current, instead of the circuits 24*a* and 25*a*. In addition, to raise the hold voltage Vhold up to a predetermined value, it utilizes the pump circuit 24*a* with larger supplying capacity and the limiter circuit 25*a* with larger bias current, while charging the ripple capacitor 27 with a larger capacitance value up to a hold voltage Vhold, decreasing time for the rise of voltage. This may achieve accelerated operation, while minimizing required power consumption.

While an embodiment of the present invention has been described, the present invention is not intended to be limited to the disclosed embodiment and various other changes, additions or the like may be made thereto without departing from the spirit of the invention.

What is claimed is:

1. A semiconductor integrated circuit configured to control a MEMS-type variable capacitance capacitor having primary electrodes with a MEMS structure for frequency modulation and auxiliary electrodes for changing a distance between the primary electrodes to change the capacitor's electrostatic capacitance, the semiconductor integrated circuit comprising:

a first pump circuit configured to generate a first voltage for decreasing the distance between the primary electrodes;

a second pump circuit configured to generate a second voltage for keeping the distance between the primary electrodes constant and having first supplying capacity; and a third pump circuit configured to generate the second voltage and having second supplying capacity lower than the first supplying capacity, wherein, when a supplying voltage of the first pump circuit reaches the first voltage and a deformation of the MEMS-type variable capacitance capacitor stops, the second voltage is supplied by the third pump circuit instead of the second pump circuit.

2. The semiconductor integrated circuit according to claim 1, further comprising:

a control circuit configured to control the first, second, and third pump circuits.

3. The semiconductor integrated circuit according to claim 1, further comprising:

a switching circuit configured to selectively supply the first voltage and the second voltage to the auxiliary electrodes.

4. The semiconductor integrated circuit according to claim 3, further comprising:

a switching circuit configured to selectively connect the second pump circuit or the third pump circuit to the auxiliary electrodes.

* * * * *